US008468230B2

(12) United States Patent
Murata

(10) Patent No.: US 8,468,230 B2
(45) Date of Patent: Jun. 18, 2013

(54) METHOD, APPARATUS AND RECORDING MEDIUM FOR MIGRATING A VIRTUAL MACHINE

(75) Inventor: Miho Murata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 563 days.

(21) Appl. No.: 12/248,726

(22) Filed: Oct. 9, 2008

(65) Prior Publication Data
US 2009/0106409 A1 Apr. 23, 2009

(30) Foreign Application Priority Data

Oct. 18, 2007 (JP) ................................ 2007-271692
Jun. 23, 2008 (JP) ................................ 2008-163251

(51) Int. Cl.
G06F 15/16 (2006.01)
G06F 12/00 (2006.01)

(52) U.S. Cl.
USPC .......................................... 709/223; 709/250

(58) Field of Classification Search
USPC ................... 709/200, 220, 223–229, 250
See application file for complete search history.

(56) References Cited

U.S. PATENT DOCUMENTS

| 7,257,811 | B2* | 8/2007 | Hunt et al. ...................... 718/1 |
| 7,577,722 | B1* | 8/2009 | Khandekar et al. ............ 709/220 |
| 7,607,129 | B2* | 10/2009 | Rosu et al. ....................... 718/1 |
| 2005/0251802 | A1 | 11/2005 | Bozek et al. |
| 2006/0195715 | A1 | 8/2006 | Herington |
| 2007/0079307 | A1* | 4/2007 | Dhawan et al. .................. 718/1 |
| 2007/0130566 | A1* | 6/2007 | van Rietschote et al. ......... 718/1 |
| 2007/0204266 | A1* | 8/2007 | Beaty et al. ...................... 718/1 |
| 2007/0266383 | A1* | 11/2007 | White ............................... 718/1 |
| 2007/0283348 | A1* | 12/2007 | White ............................... 718/1 |
| 2008/0034366 | A1 | 2/2008 | Tanaka et al. |
| 2008/0104608 | A1* | 5/2008 | Hyser et al. .................. 718/105 |
| 2008/0184225 | A1* | 7/2008 | Fitzgerald et al. ............... 718/1 |
| 2009/0024713 | A1* | 1/2009 | Strasenburgh et al. ........ 709/208 |
| 2009/0199177 | A1* | 8/2009 | Edwards et al. .................. 718/1 |
| 2010/0061391 | A1* | 3/2010 | Sindhu et al. .................. 370/412 |

FOREIGN PATENT DOCUMENTS

| JP | A 2002-202959 | 7/2002 |
| JP | A 2006-244481 | 9/2006 |
| WO | WO 2005/109195 A2 | 11/2005 |

OTHER PUBLICATIONS

"Centralized Management for VMware Server," http://www.vmware.com/products/server/vc.html.
Notification of Reasons for Refusal mailed Jun. 5, 2012 for corresponding Japanese Patent Application No. 2008-163251 (partial English translation enclosed).

* cited by examiner

Primary Examiner — Zarni Maung
(74) Attorney, Agent, or Firm — Greer Burns & Crain, Ltd.

(57) ABSTRACT

In one embodiment, a method for migrating a virtual machine (VM) under operation from one server to another server among a plurality of servers is provided. The method includes providing a schema defined beforehand by an operator, an Application-dependent policy using the schema, and an total optimization policy to optimize the system totally, receiving periodically a status information for the application on the VM and a static or dynamic information for the server and the VM from each server, judging whether there is any VM to migrate to another server by referring to the application-dependent policy and the total optimization policy, based on the status information of the application and the static or dynamic information of the VM, and determining a migration destination of the VM matched with the migration condition.

15 Claims, 17 Drawing Sheets

METHOD, APPARATUS AND RECORDING MEDIUM FOR MIGRATING A VIRTUAL MACHINE

BACKGROUND OF THE INVENTION (1) Field of the Invention

The present invention relates to a technology for determining a target physical server to which a virtual machine is migrated, and especially deals with a migration method and an apparatus for controlling migration of a virtual machine by taking characteristics of various applications into consideration.

(2) Description of the Related Art

In recent years, a server consolidation by operating a plurality of virtual machines on one of physical servers is prospering. By means of the above server consolidation, a coupling between an application in a system and a physical server in which the application is to be executed becomes weakened, and a more flexible system configuration is becoming possible.

In the server consolidation, a live migration technology of moving a virtual machine to other physical servers without stopping the system under operation is used for maintenance, load sharing, and power saving.

For example, if a virtual machine on the server is moved to another server by the live migration, system maintenance without stopping the hardware becomes possible. Further, load sharing will become possible if a migration of a heavy load virtual machine to a more highly efficient server is carried out. Also if low load virtual machines are brought together to one server, power saving will become possible by dropping the power supply of the unused server.

However, it is very inefficient that an operator judges whether a virtual machine should be migrated to another server for load sharing or power saving. Therefore, automation for migration of virtual machine is desired.

SUMMARY

In one embodiment, a method for migrating the virtual machine (VM) under operation among a plurality of servers is provided. The method includes providing a schema defined beforehand by an operator, an application-dependent policy using the schema, and a total optimization policy to optimize the system totally, receiving periodically a status information for the application on the VM and a static or dynamic information for the server and the VM from each server, judging whether there is the VM to move to others by referring to the application-dependent policy and the total optimization policy, based on the status information of the application and the static or dynamic information of the VM, and determining a migration of the VM matched with the migration condition.

BRIEF DESCRIPTION THE DRAWINGS

Figure 16:
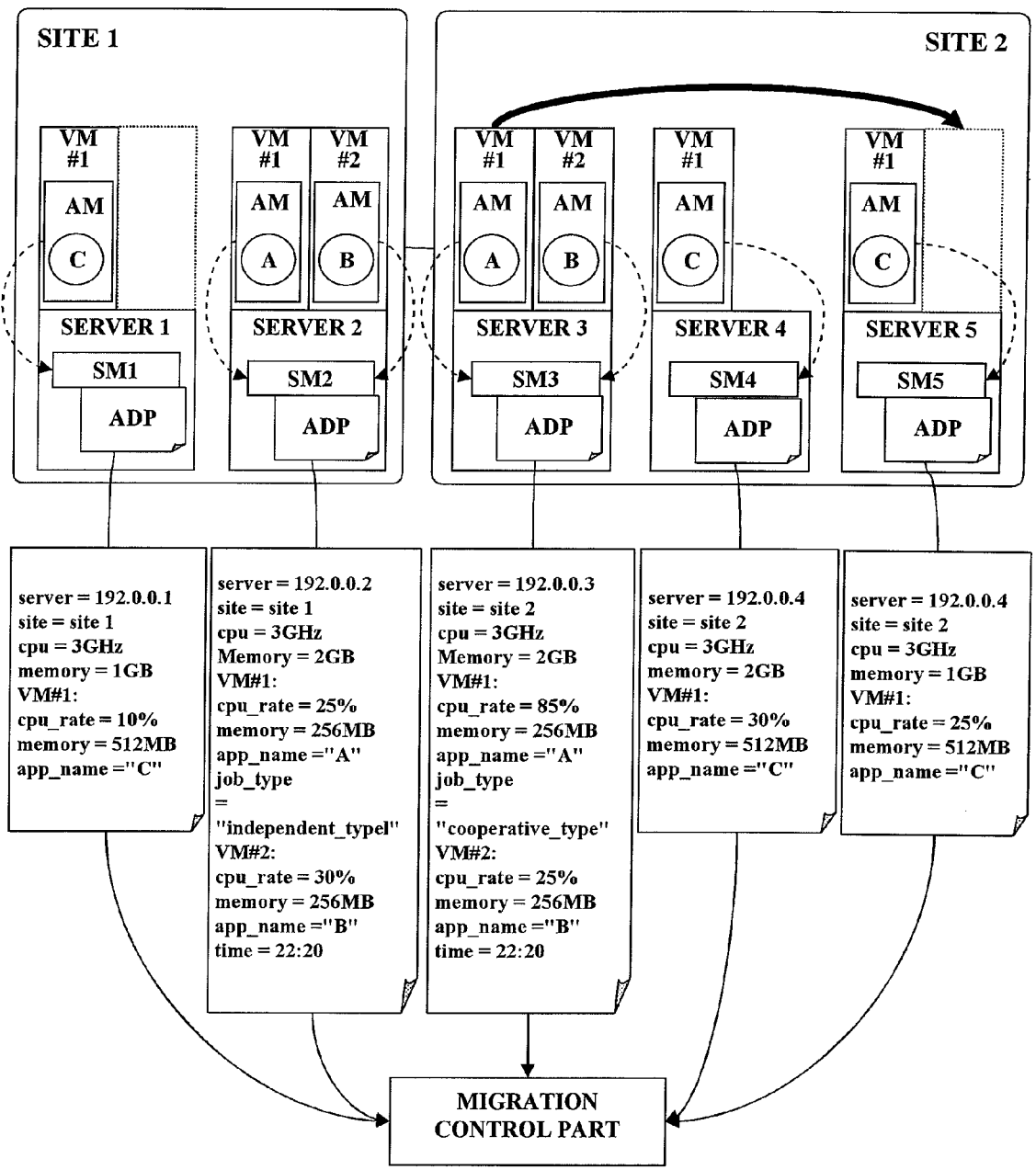
Figure 17:
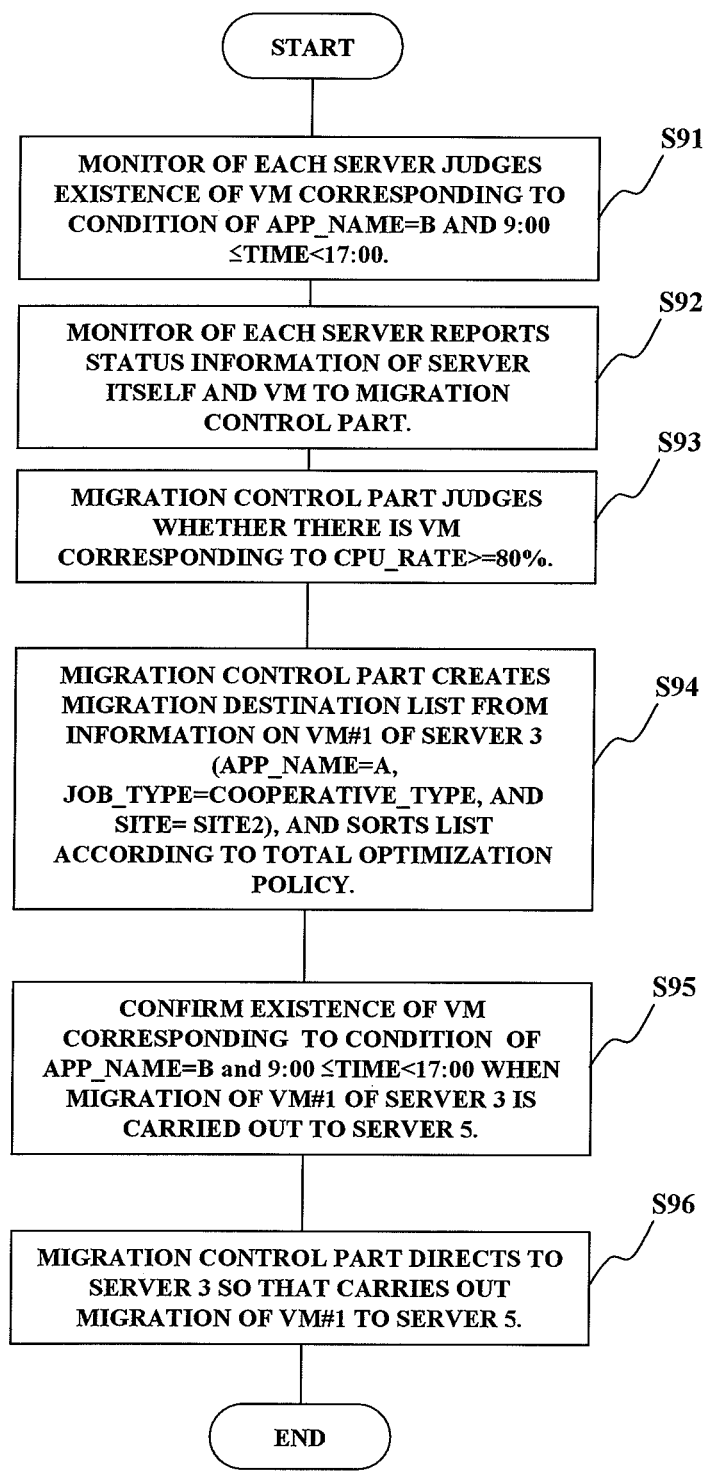

FIG. 16 shows an example of information acquired from server monitor and application monitor in the case 2, according to the embodiment 2; and FIG. 17 shows an example of a flow chart of migration processing based on an application-dependent policy (the case 2), according to the embodiment 2.

DETAILED DESCRIPTION OF THE EMBODIMENTS

Embodiments 1 and 2 will now be described in detail with reference to the following figures. In the embodiment 1, it is shown using FIGS. 1-9 that only a virtual machine management apparatus takes charge of dealing with decision process of a migration destination (concretely, server) of the virtual machine. And in the embodiment 2, it is shown using FIGS. 10-17 that each server partially takes charge of dealing with decision process of a migration destination of the virtual machine according to an application-dependent policy copied beforehand in the server from the virtual machine management apparatus.

Figure 1:
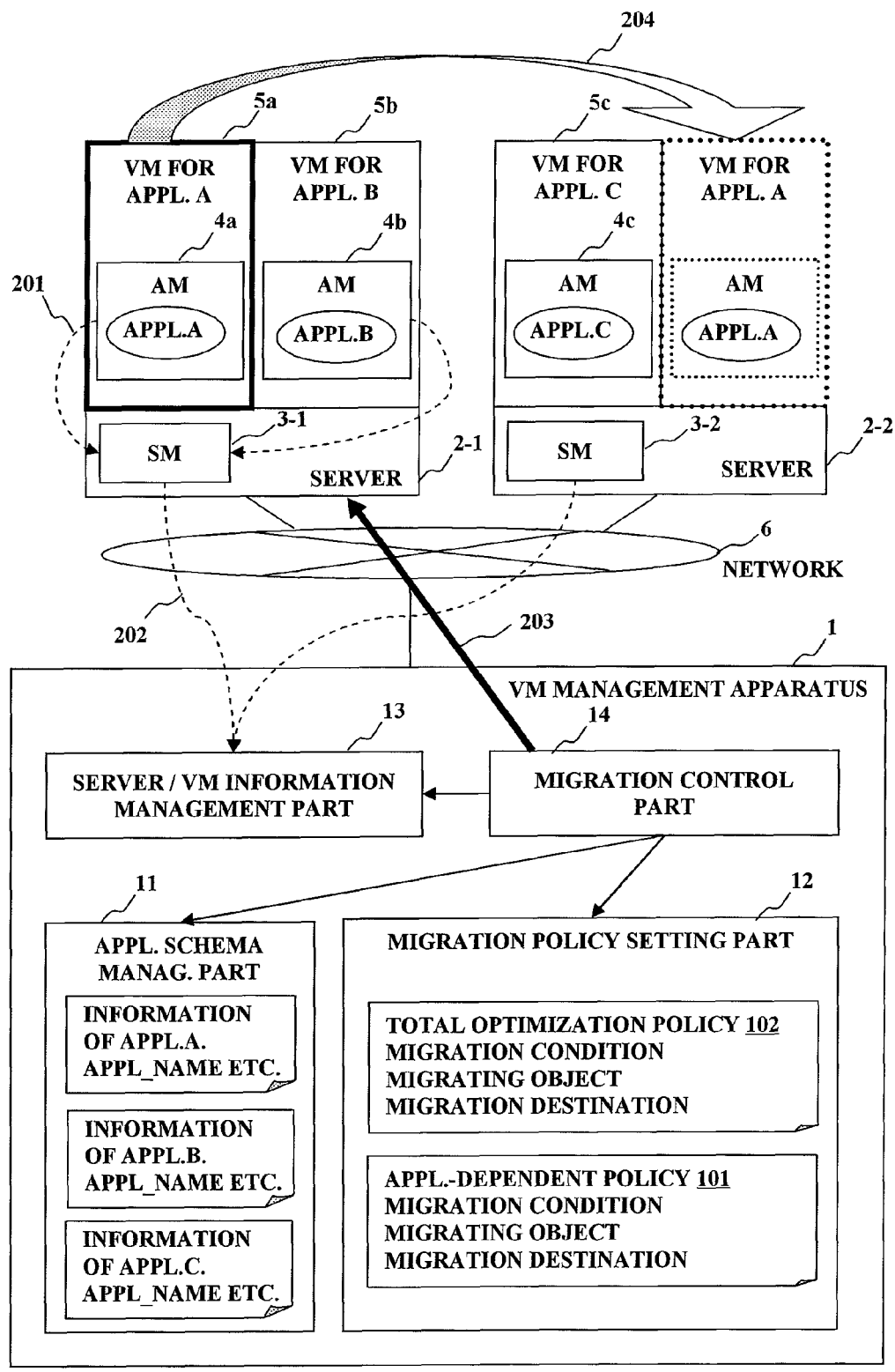
FIG. 1 shows an example of a basic migration system configuration according to an embodiment 1.

FIG. 1 shows an example of a basic migration system configuration of an embodiment 1. In the embodiment 1, the migration destination of the virtual machine is determined only by judge of the virtual machine management apparatus.

This migration system, for example, consists of two or more servers (server 2-1, server 2-2) which are connected to the virtual machine management apparatus 1 through the network 6. Each server is equipped with one or more virtual machines (VM) which are divided and the server monitor (SM). Moreover, status information of each application working on the virtual machine is periodically reported to the virtual machine management apparatus 1 by an application monitor (AM) through the server monitor (SM).

The server 2-1 is, for example, composed of the server monitor (SM 3-1), and two divided virtual machines VM 5a and VM 5b where VM 5a includes the application monitor AM 4a which supervises an application A, and VM 5b includes an application monitor AM 4b which supervises an application B. The server 2-2 is, for example, composed of SM3-2 and one divided VM5c including AM4c which supervises the application C. Although FIG. 1 shows two servers and three virtual machines in operation, there is no restriction in the number of servers and virtual machines to be operated.

Here, the application monitors AM 4a, AM 4b, and AM 4c operate in such a manner that one application monitor supervises one application corresponding thereto, and the status information of each application is periodically reported to the server monitor SM 31 and SM 32 according to the schema defined beforehand by the schema management part 11 of the VM management apparatus 1. As a method of reporting the status information, the application monitor may transmit status information to the server monitor, or the server monitor may ask the application monitor for status information.

In addition, dotted lines 201 and 202 show respectively a flow of the information from AM to SM and from SM to the server/VM information management part 13. A solid arrow 203 and an arrow 204 show a direction from migration control part 14 to the server and a direction of migration between servers, respectively.

Moreover, the server monitor (SM31, SM32) operates as one server monitor per each physical server, and reports periodically static information or load information of CPU and memory in each server, dynamic information of the virtual machine, and application information obtained from the application monitor to the server/VM information management part 13 of the virtual machine management apparatus 1. In the method of a report, the server monitor may transmit information to the server/VM information management department 13, or the server/VM information management part 13 may ask for the server monitor.

Furthermore, the virtual machine management apparatus 1 includes the application schema management part 11 which defines the schema of application information beforehand, the migration policy setting part 12 which sets up the application-dependent policy (ADP) depending on the application and the total optimization policy optimizing the whole system when moving the virtual machine, the server/virtual machine information management part 13 which receives periodically the status information of the application and the static or dynamic information of the server itself and the virtual machine, and the migration control part 14 which determines the migration destination of the virtual machine by referring to the application-dependent policy or the total optimization policy on the basis of the received information.

The server/VM information management part 13 acquires the information from two or more server monitors, and offers the information in response to an inquiry from the migration control part 14.

The migration control part 14 periodically inquires of the server/VM information management part 13 whether there is any information corresponding to the migration condition of the policy defined by the migration policy setting part 12. Alternatively, the server/VM information management part 13 can periodically transmit information corresponding to the migration condition, to the migration control part 14.

When there is information corresponding to the migration condition, the migration control part 14 determines the corresponding virtual machine and its migration destination on the basis of a migration policy, and directs the server on which the virtual machine is working to perform a migration of the virtual machine.

In the case, the schema of the information, which is reported to the server monitor by the application monitor (AM) and then finally reported to the server/VM information management part 13, is defined beforehand by the application operator and is stored in the application schema management part 11.

Using the schema defined here, the migration policies are defined and stored in the migration policy setting part 12.

In the migration policy setting part 12, the migration condition for judging migration, the migrating object (virtual machine) to be migrated, and the migration destination (server) are defined beforehand by an operator and stored in memory area of the virtual machine management apparatus 1.

The virtual machine management apparatus 1 can be configured as a computer equipped with a CPU and a memory (not shown in FIG. 1), and a migration program stored in the auxiliary storage unit (not shown in FIG. 1) can be loaded into the memory at the time of a start-up, and each processing of migration is performed by the CPU.

Moreover, the virtual machine management apparatus 1 can be configured as a management server, connected to a group of the above-mentioned servers through the network 6, which manages the group of the above-mentioned servers and virtual machines operating therein.

Figure 2:
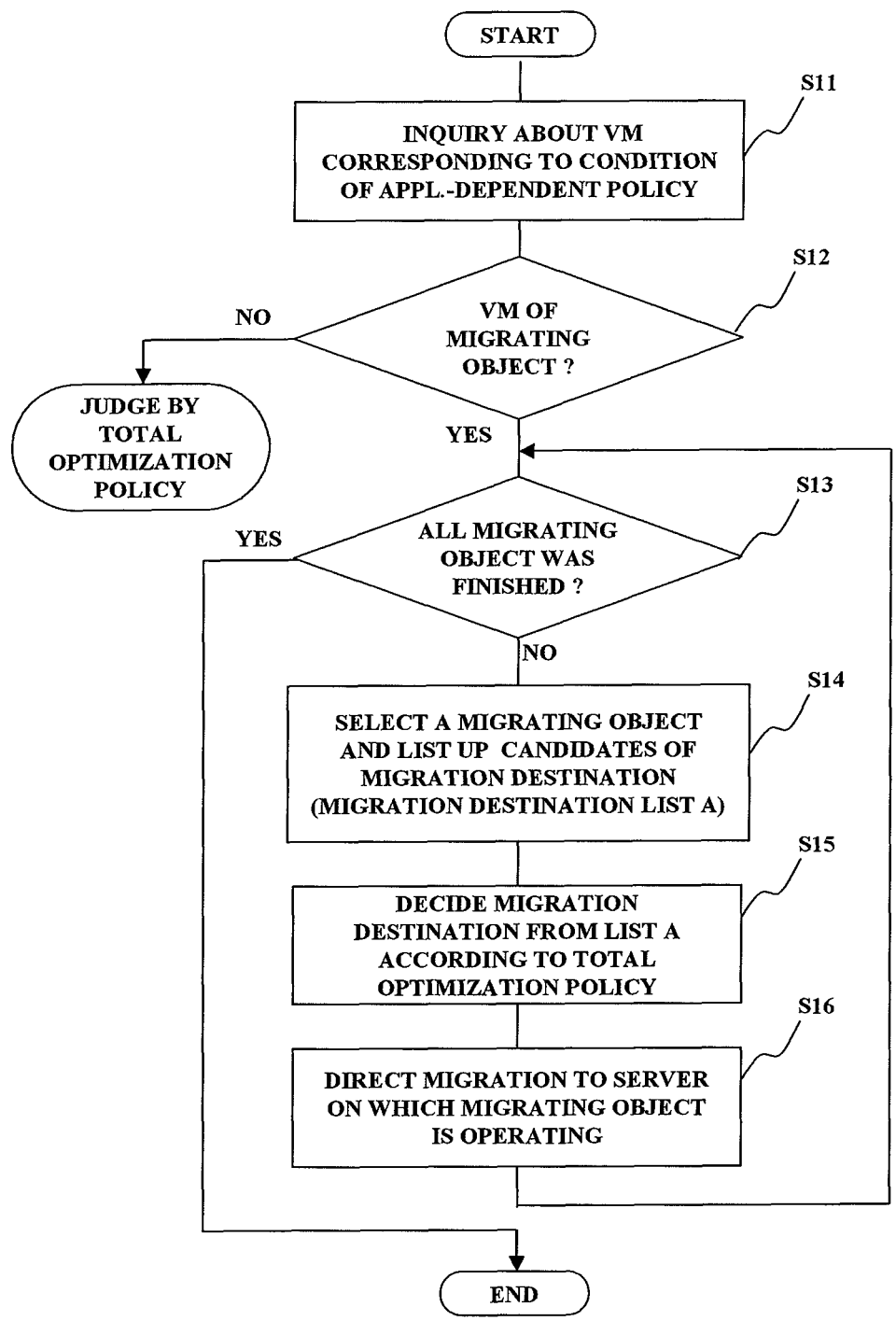
FIG. 2 shows an example of a flow chart of migration processing based on application-dependent policy, according to the embodiment 1.

FIG. 2 shows an example of a flow chart of migration processing based on application-dependent policy, according to the embodiment 1.

In step S11, the migration control part 14 asks the server/VM information management part 13 whether a VM which fulfills the migration condition of the application-dependent policy exists.

Figure 3:
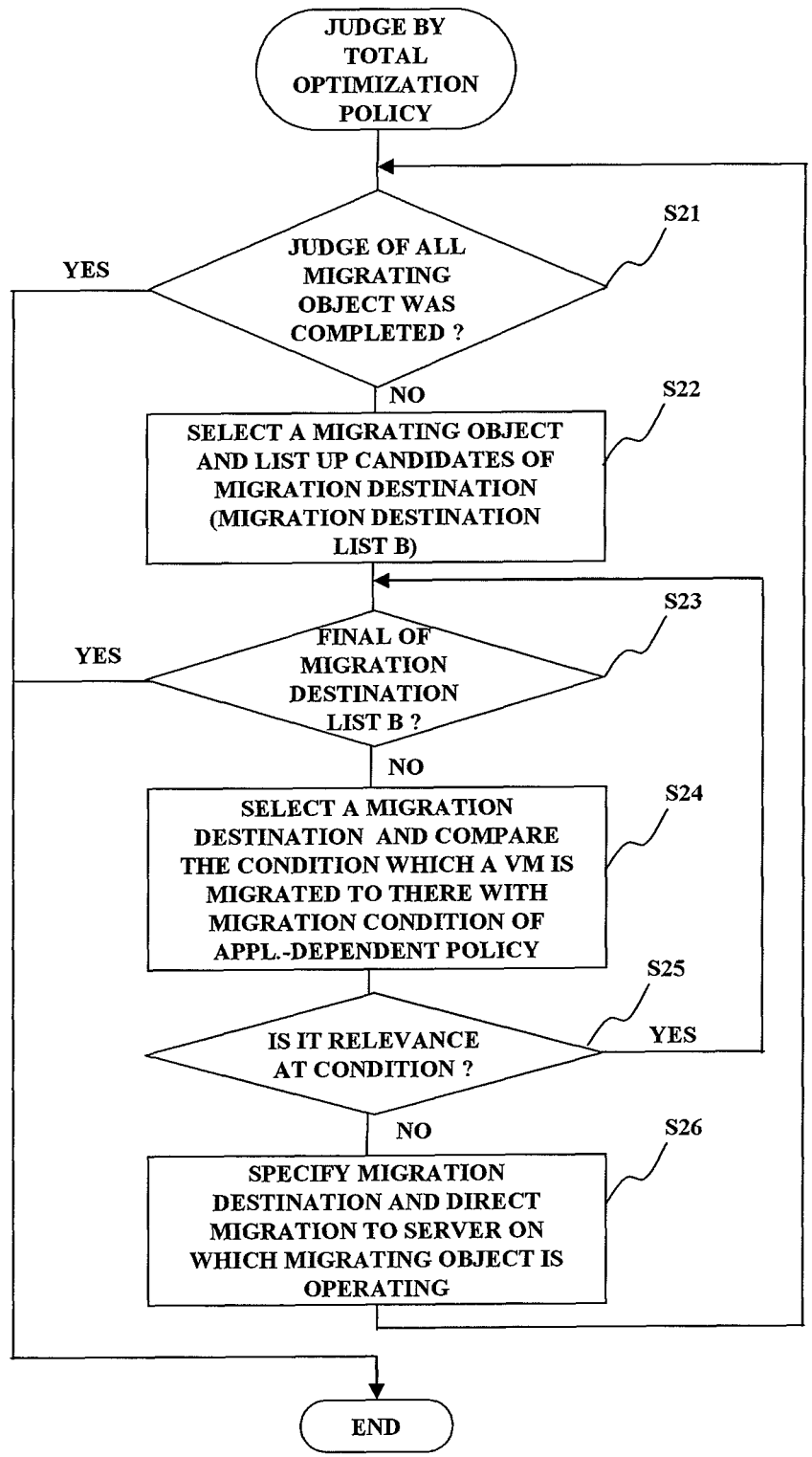
FIG. 3 shows an example of a flow chart of migration processing based on a total optimization policy, according to the embodiment 1.

In step S12, the server/VM information management part 13 returns the required information to the migration control part 14, when there is the VM (migrating object) which fulfills the migration condition. Moreover, when there is no VM which fulfills the condition, the program proceeds to next step judged by the total optimization policy (FIG. 3).

In step S13, when there is any VM which fulfills the condition, next it judges whether all migrating object is picked.

In step S14, when there are two or more applicable migrating objects, it chooses one of them and lists as a migration destination candidate. This corresponds to the migration destination list A.

In step S15, the migration control part 14 determines the migration destination from the migration destination list A according to the definition of the migration destination of the total optimization policy.

In step S16, the migration control part 14 directs migration to the server which the migrating object (VM) is under operation.

When the migrating object still remains, the program returns to step S13, and following steps S14-S16 are repeated.

FIG. 3 shows the flow chart of the migration processing by the total optimization policy. It shows the flow chart of the migration control part 14 in the case which there is no VM which fulfills the migration condition of the application-dependent policy, but there is VM which fulfills the migration condition of the total optimization policy.

In step S21, the migration control part 14 checks whether the migration judge to be finishing to all the migrating objects.

In step S22, when there are two or more migrating objects, it chooses one of them and lists migration destination candidates. The migration destination candidates are stored in the memory area as the migration destination list B.

In step S23, then, the migration control part 14 checks whether the migration destination list B reached at the end.

In step S24, when the one migration destination is sequentially chosen from the head of the migration destination list B and migration is actually carried out there, whether it coincides with the migration condition of the application-dependent policy is checked.

In step S24, one migration destination is selected from the head of the migration destination list B, and it is assumed that a virtual machine is migrated to the selected migration destination. The migration control part 14 checks whether there is any VM which corresponds to the migration condition of the application-dependent policy based on the assumption.

In step S25, when it is judged that there is VM which corresponds to the migration condition of the application-dependent policy, the migration is not performed, but the next candidate from the migration destination list B is selected. And returning to step S23, subsequent steps are repeated.

In step S26, when it is judged with not corresponding to the migration condition of the application-dependent policy, the migration control part 14 directs migration to the server on which the migrating object is working. When the migrating object still remains, returning to step S21, subsequent steps are repeated.

In the case of only corresponding to the migration condition of the total optimization policy, if migration is shortly after actually carried out, it may correspond to the migration condition of the application-dependent policy, and migration may be performed. Therefore, the migration control part 14 controls not to perform the above-mentioned processing in such a case for efficiency improvement.

That is, in the above-mentioned flow-chart, although priority is given to the application-dependent policy, the total optimization policy would also be taken into consideration, and efficient migration control will be performed.

Figure 4:
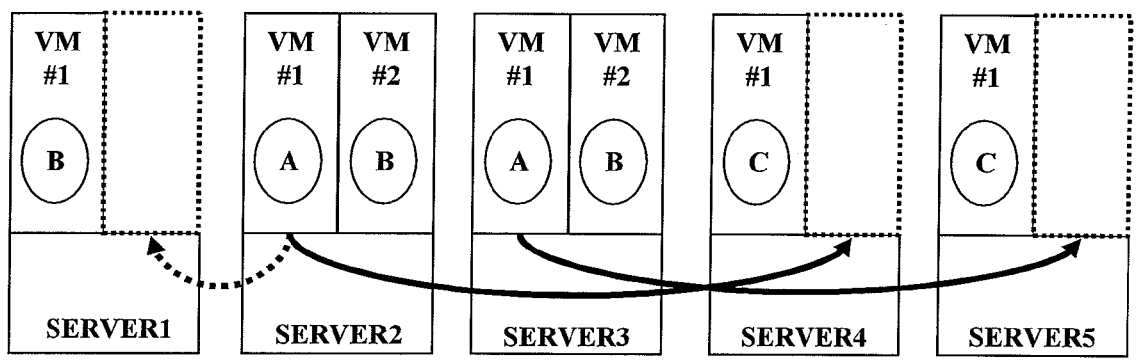
FIG. 4 shows an example of a schematic diagram for determining migration destination on the basis of condition for executing an application (case 1: monopolizing the server for a certain time zone), according to the embodiment 1.
Figure 5:
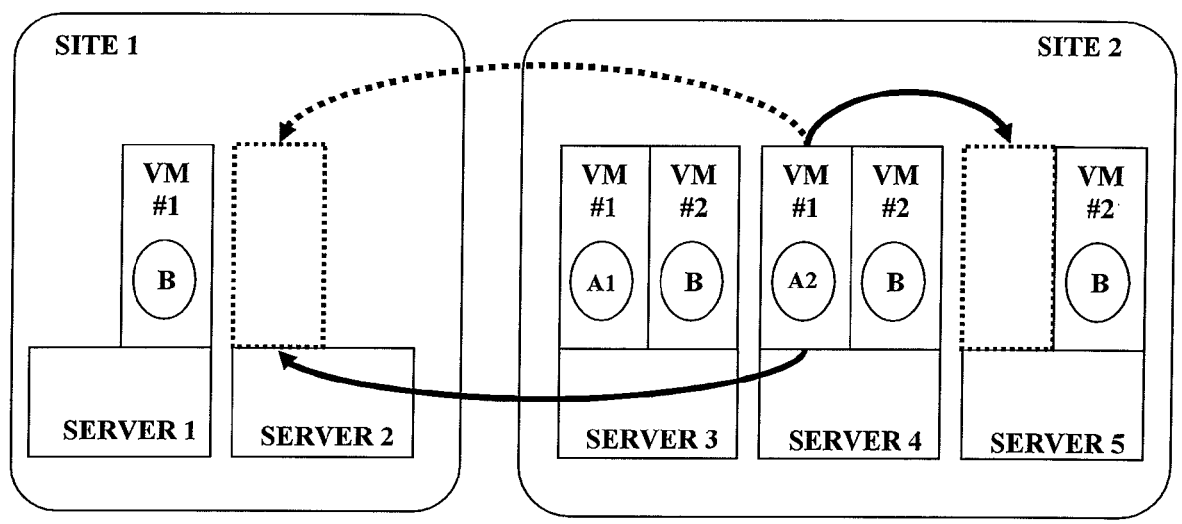
FIG. 5 shows an example of a schematic diagram for determining migration destination on the basis of condition for executing an application (case 2: determining by the job-type of application), according to the embodiment 1.

Hereafter, it is explains the mechanism in which the migration destination of a virtual machine is determined according to the situation of an application, using FIGS. 4 and 5.

FIG. 4 shows a schematic diagram for deciding migration destination by application matters (case 1: monopolizing the server for a certain time zone).

The situation of the application in the case 1 is the content "the VM which the application A is under operation in the servers 2 and 3 should be moved to others since the application B is in a time zone which monopolizes the server."

The application B which should monopolize a certain time zone is working on each VM of the server 1, the server 2, and the server 3. The application C is an application to which living together with other applications is always permitted, and is working on each VM of the server 4 and the server 5.

Under such environment, the VM in which the application A is working on the servers 2, 3 should be moved to other servers. As the migration destination of the VM for the application A, although the server 1 low load (10% of CPU activity ratio of VM), it is impossible to move since the application B is working. Instead the server 4 (30% of CPU activity ratio of VM) and the server 5 (25% of CPU activity ratio of VM) in which the application B is not working becomes a candidate.

FIG. 5 shows a schematic diagram for deciding migration destination by application matters (case 2: deciding by the job-type of application). The situation of the application in the case 2 is the content "the VM while the application A2 is working should be moved to another server since the load of the server 4 is high."

At the site 1 to which the server 1 and the server 2 belong, only the server 1 is working the application B. On the other hand, at the site 2 to which the servers 3, 4, 5 belong, the CPU activity ratio of VM in the server 4 is 80% and the CPU activity ratio of VM in the server 5 is 30%.

Now the applications A1 and A2 work on different VM in the site 2, but are the same applications, and if the jobs on the application A1 and the application A2 cooperate or operate independently, it is thinkable the following two cases (case 1 and case 2).

Case 1 is a case that the jobs on the application A1 and the application A2 are cooperating. Since movement of the VM among the servers of the different site is impossible even if there is low load server in different site, the VM for application A2 moves to the server 5 in same site 2.

Case 2 is a case that the jobs on the application A1 and the application A2 are operating independently. It is possible that the VM for the application A2 migrates to the server 2 of low load at the different site 1.

Next, the migration processing which embodies the above mentioned case 1 and case 2 is explained in detail in reference to FIGS. 6-9.

Hereinafter, an example of precondition for the migration system, and examples of conditions for application, the total optimization policy, and the application-dependent policy, which are common in FIGS. 6-9, will be described.

1. Precondition for the Migration System
(a) It is assumed that the scene is a data center that lends out two or more servers to two or more customers.
(b) One or more VM(s) work on one set of a server, and one VM as a unit is lent out to a customer.
(c) The servers are installed in the two sites 1 and 2, and the sites are connected each other via the network. It is possible to use the servers in both sites simultaneously.
(d) The number, performance, etc. of VM lent out to the customer is determined according to the operation plan of a data center and the fee system.
(e) Each application uses one or more VM(s).

2. Condition for Application
Following three applications (A, B, C) work on VMs.
First, application A works in the distributed computer system environment with two cases by independent operation or cooperative operation for two or more jobs (for example, job queuing system etc.).

An information schema of the application A is as following:
app_name (String): A
job_type (String): cooperative_type/independent_type Next, application B works on the servers for connecting with multiple user terminals and occupies one set of a physical server in the time zone (9:00-17:00) of daytime when an operating ratio is high (for example, TV conference system etc.)

The information schema is as following:
app_name(String): B
time(time): Time

At the last, application C works on two or more servers in which multi-jobs are executed dispersedly, wherein each job always operates independently in the servers (for example, job queuing system etc.).

The information schema is as following:
app_name(String): C

3. Condition for Total optimization Policy
The total optimization policy for optimizing whole of a system like a data center is composed with items of the migration condition what to supervise, the migrating object (VM to move), and the migration destination as the movement destination of the migrating object. And the items are set up by the system operator beforehand.

Figure 6:
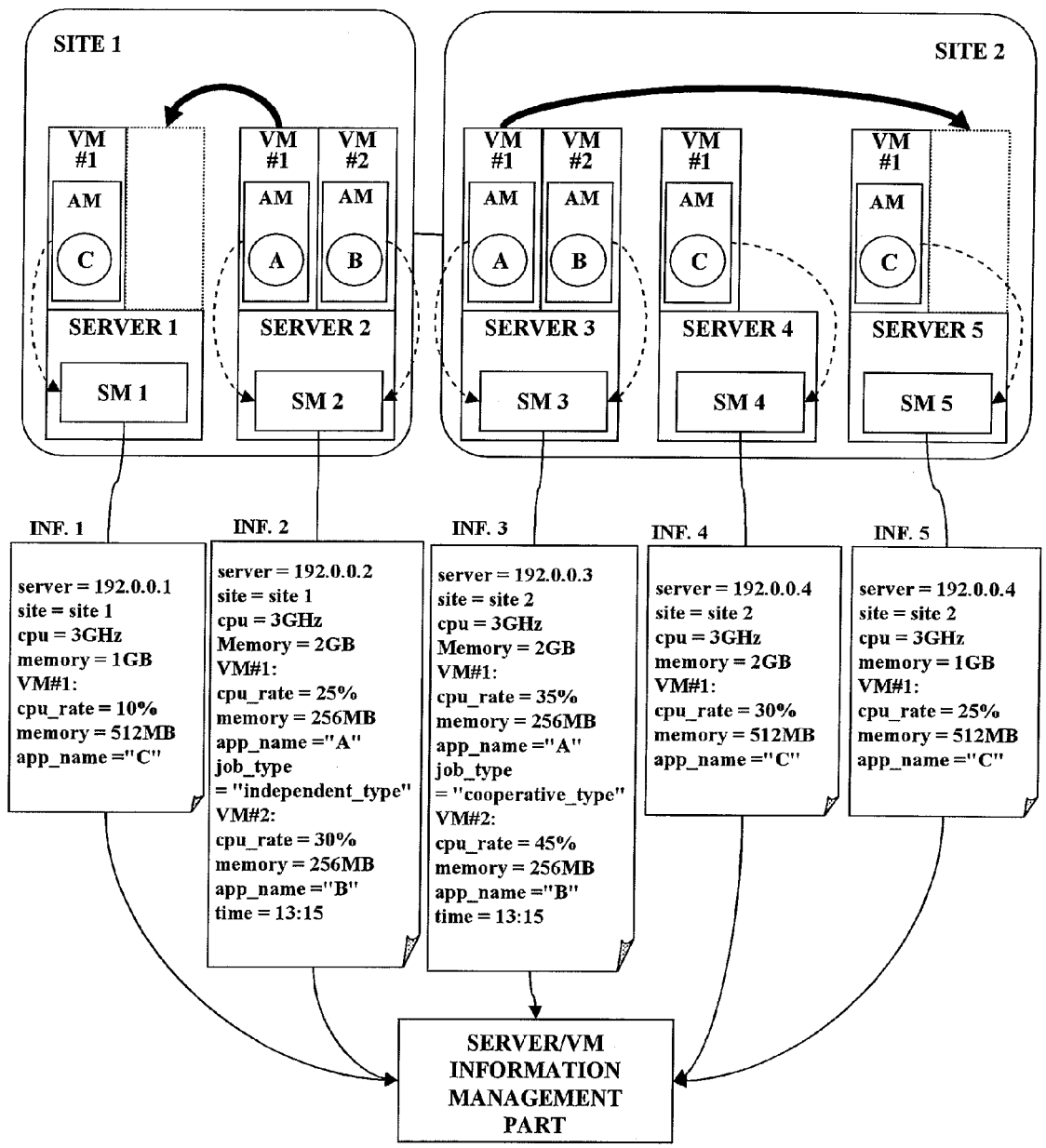
FIG. 6 shows an example of information acquired from server monitor and application monitor in the case 1, according to the embodiment 1.

An example of the total optimization policy is shown as following.
Migration Condition The migration is executed when the CPU activity ratio of one VM exceeds 80%.
Migrating Object It is the VM which the CPU activity ratio exceeds 80%.
Migration destination: It is selected by determining the sum of the CPU activity ratio of the operation VM. As a concrete method for making a candidate list of migration destination, following sort keys and an ascending order or descending order are defined. The sort key of the list: cpu_rate(1)+ . . . + cpu_rate (n) (n: number of VM)
An ascending order/descending order: Ascending order
However, since the CPU performance may differ in each server, the CPU activity ratio may be weighed according to its performance at defining the sort key and added to it.
4. Condition for Application-Dependent Policy:
The application-dependent policy depending on an application (above-mentioned applications A, B, and C are used) is constructed with the same items as the above-mentioned total optimization policy, and its contents are set up by the application operator or the system operator. Below, an example is shown.
Migration Condition Application B is in operation (app_name=B) and a time to be used is 9:00≦time<17:00.
Migrating object: In the server which the VM for application B operates, all VM except the VM for application B (app_name≠B) are migrating objects.
Migration destination:
(1) When migration of the VM which the application A is under operation is carried out, the migration destination is as follows:
   In the case of job_type=cooperative_type, the server on which the application B is not working in the same site.
   In the case of job_type=independent_type, the server on which the application B is not working.
(2) When migration of the VM which the application C is under operation is carried out, the migration destination is as follows:
   The server on which the application B is not working
FIG. 6 shows information acquired from server monitor and application monitor in the case 1. By this example, it is shown that migration of the VM for other applications are working is carried out, since the application B is monopolizes a server in a time zone. Namely, FIG. 6 shows a case that there is a VM which fulfills the migration condition of the application-dependent policy of FIG. 2.

For example, the information 2 and 3 on the servers 2 and 3 on which the application B is working is explained as following. In the information 2, as server information, server name: 192.0.0.2, site name: site 1, CPU: 3 GHz, and memory: 2 GB is acquired, and as VM information, CPU activity ratio of VM#1: 25%, memory: 256 MB application name: A, job type: independent_type, and CPU activity ratio of VM#2: 30%, memory: 256 MB, application name: B, and time: 13:15 are acquired.

As for the information 3, as server information, server name: 192.0.0.3, site name: site 2, CPU: 3 GHz, and memory: 2 GB is acquired, and as VM information, CPU activity ratio of VM#1: 35%, memory: 256 MB, application name: A, job type: cooperative_type, and CPU activity ratio of VM#2: 45%, memory: 256 MB, application name: B, and time: 13:15 are acquired.

Figure 7:
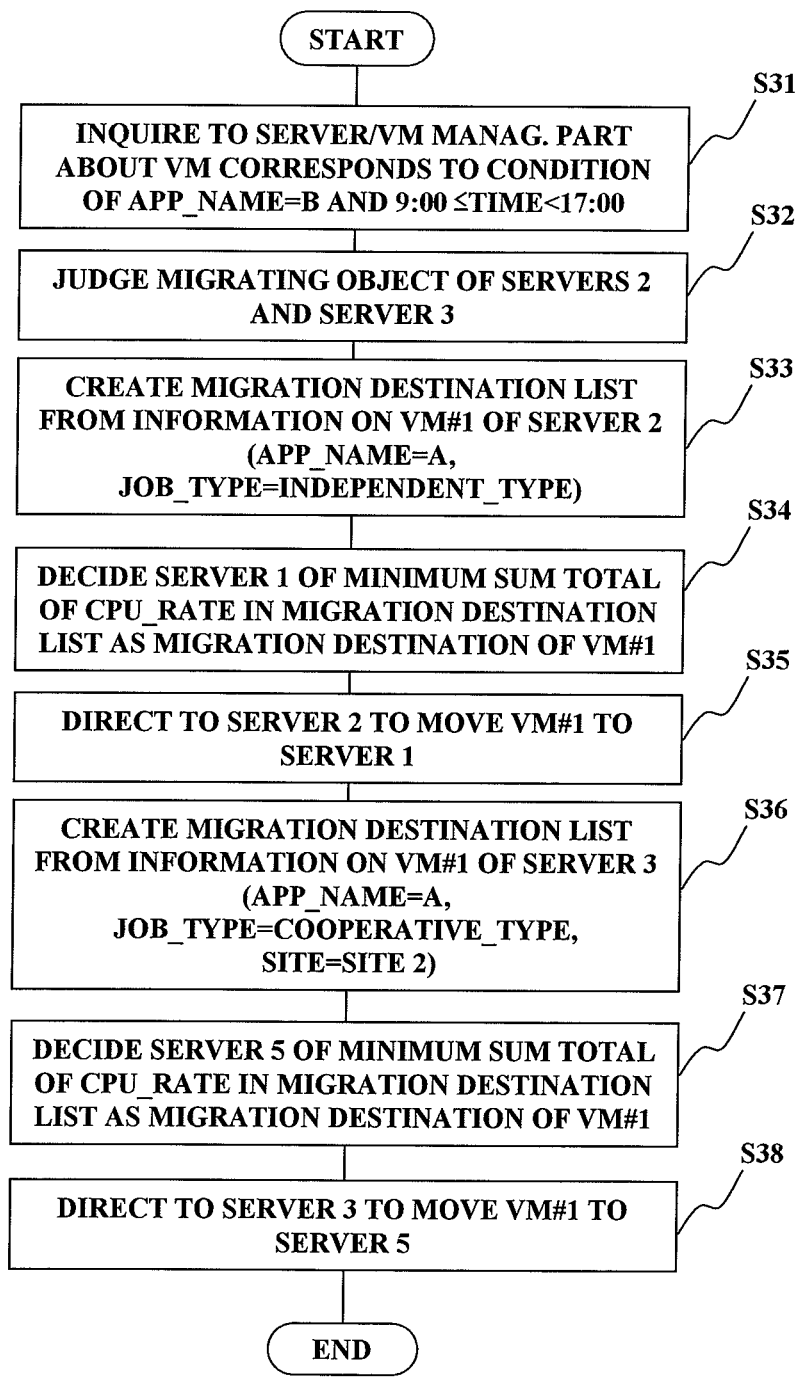
FIG. 7 shows an example of a flow chart of migration processing based on a application-dependent policy in the case 1, according to the embodiment 1.

FIG. 7 shows a flow chart of migration processing according to application-dependent policy in case 1.

In step S31, the migration control part 14 inquires to the server/VM information management part 13 whether the VM which is app_name="B" and time to occupy is 9:00≦time<17:00 exists or not. Since information (time is 13:15) which corresponds to the migration condition of an application-dependent policy in the information transmitted by the server monitor of the server 2 and the server 3 is contained, the server/VM information management part 13 notifies it to the migration control part 14.

In step S32, it is judged whether there is the migrating object in the server 2 and 3 or not. According to the defined policy, VM#1 of the server 2 and VM#1 of the server 3 is the target of migration.

In step S33, based on the information application of VM#1 in the server 2, that is, app_name="A", job_type="independent_type", the server 1, 4, and 5 are added to migration destination list.

In step S34, the server 1 which the sum total of the CPU activity ratio (cpu_rate) of VM makes the minimum is selected in the migration destination list as the migration destination.

In step S35, the migration control part 14 directs to the server 2 to move VM#1 to the server 1.

In step S36, based on the application information of VM#1 of the server 3, app_name="A", job_type="cooperative_type", and the server information of the server 3, site="site 2", the server 4 and 5 is added to the migration destination list.

In step S37, the server 5 which the sum total of the CPU activity ratio of VM makes the minimum is selected in the migration destination list.

In step S38, the migration control part 14 directs to the server 3 to move VM#1 to the server 5.

Figure 8:
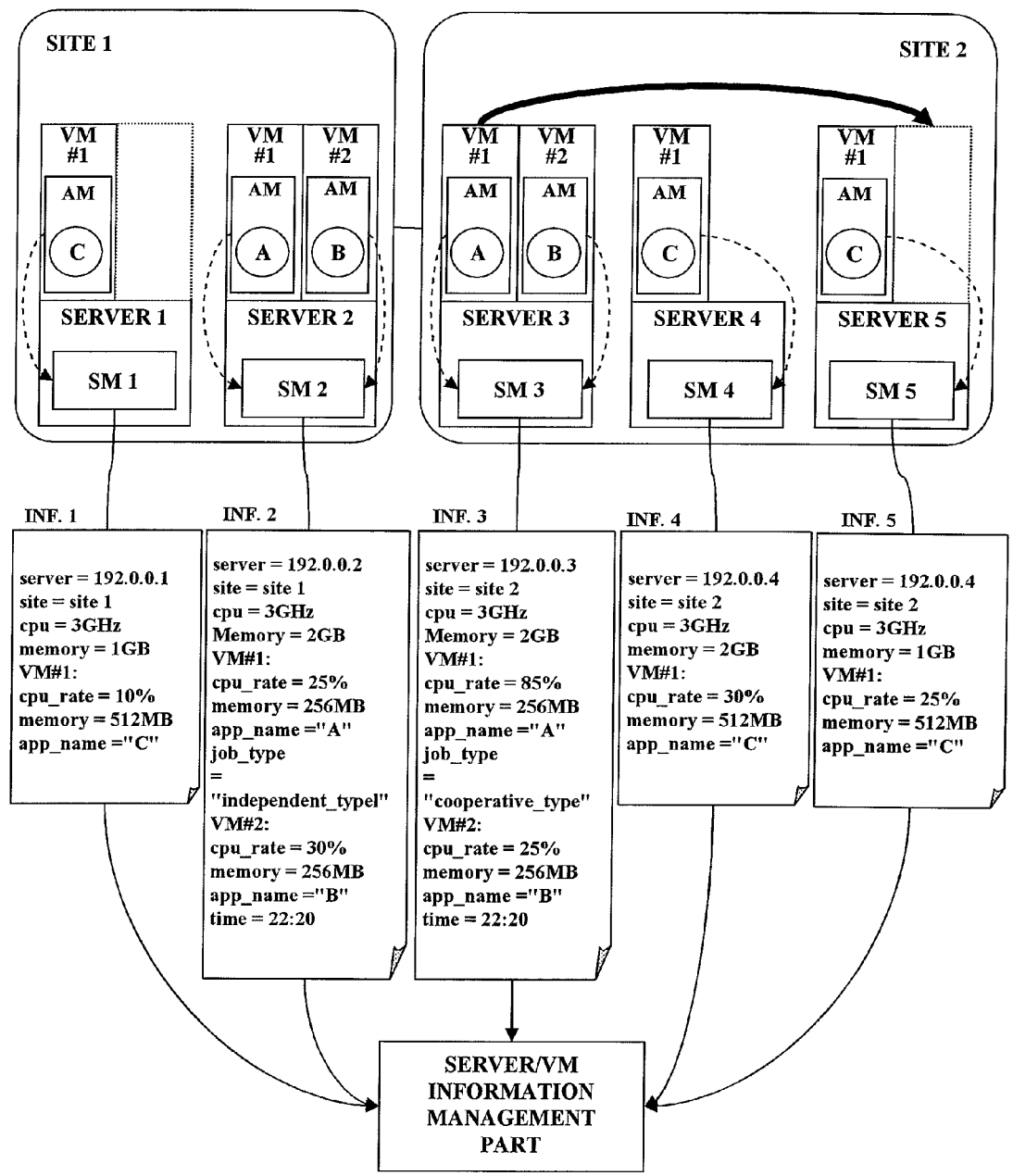
FIG. 8 shows an example of information acquired from server monitor and application monitor in the case 2, according to the embodiment 1.

FIG. 8 shows information acquired from server monitor and application monitor in the case 2. This case shows an example which solves the proposition of "to move VM which the application A is working to others since the load of the server 3 in the site 2 is high".

For example, in the information 3 of the server 3 within the site 2, as server information, server Name: 192.0.0.3, the site name: site 2, CPU: 3 GHz, and memory: 2 GB is acquired, and as for VM#1, CPU activity ratio: 85% and memory:256 MB is acquired, and application name:A, a job type:cooperative_type, and as for VM#2, CPU activity ratio:25%, memory:256 MB, app_name:B, and time: 22:20 are is acquired.

Figure 9:
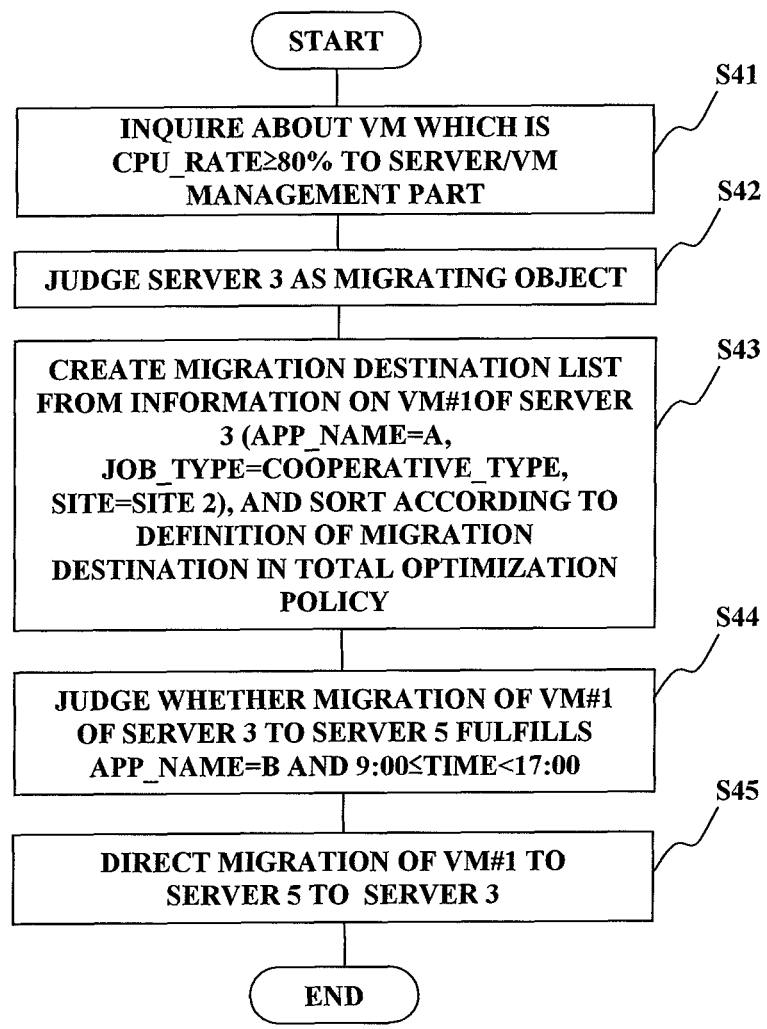
FIG. 9 shows an example of a flow chart of migration processing based on the application-dependent policy in the case 2, according to the embodiment 1.

FIG. 9 shows a flow chart of migration processing according to application-dependent policy in case 2. In this example, it is checked whether although there is no VM which fulfills the migration condition of the application-dependent policy, the example of migration in case VM which fulfills the migration condition of the total optimization policy exists or not.

In step S41, the virtual machine control part 14 asks to the server/VM information management part 13 whether there is a VM of cpu_rate>=80% or not. And the result of judge by the server/VM information management part 13 is notified.

In step S42, it judges the migrating object of the server 3. The information of VM (CPU activity ratio: 85%) which fulfills the migration condition of the total optimization policy is included in the information transmitted by the server monitor of the server 3, and coincides with the definition of the total optimization policy of "VM with the CPU activity ratio of greater than 80%", VM#1 of the server 3 becomes a migrating object.

In step S43, the migration destination list is created from both the application information of VM#1 of the server 3, app_name="A", job_type="cooperative_type", and the server information (site=site 2) of the server 3 and is sorted according to the migration destination definition of the total optimization policy (the server 4, the server 5).

In step S44, next, when migration of VM#1 of the server 3 is carried out to the server 5, it is judged whether it corresponds to the migration condition of "app_name=B and 9:00≦time<17:00" in the application-dependent policy.

In step S45, since it does not correspond to condition, the migration control part 14 directs to carry out migration of VM#1 to the server 5 to the server 3.

As mentioned above, by the present invention in the application-dependent policy, it becomes possible to set the definition of not only a quantitative information, a CPU load etc., but also a qualitative information, for example, "the inside of the same site", or "a certain application is working or not", as judging criterion of the migration destination in the application-dependent policy. That is, the present invention provides the migration control which gives priority to the situation of application over the whole system and the system environment where the application of various customers, such as a data center, works on the virtual machine, wherein not only the operating policy decided by the system side but also the operating policy of each application can be reflected.

Only the static information beforehand fixed In the case of taking into consideration the migration based on the qualitative information, in the prier art, only the static information beforehand fixed can be used, but the present invention gives a flexible operating environment of application (the first start-up environment, the migration destination, etc.)

Moreover, in the migration policy of the present invention, as it includes the definition using dynamic information, "the same site as the site under present operation" etc., not the static information like an IP address of a server etc., can respond flexibly also at the time of a server failure or a configuration change, and the operation environment of application becomes large compared with the conventional technology.

Moreover, as in the present invention, the user (the operator of the application or the system in fact) the migration policy depending on application, addition of a new application to the system can be performed flexibly.

Even if the past definition portion of the application-dependent policy will be changed with a new application, it is not necessary to remount software or to newly develop, and the definition is only reset. That is, it is applicable to the environment like a data center where the applications of various customers are operated.

Furthermore, with the conventional technology, the application operator's policy needed to be forcibly united with the system operator's policy, but with the present invention, as defining the total optimization policy and the application-dependent policy are defined respectively by the application operator (for example, user of a data center) and the system operator (for example, operator of a data center), it becomes possible that two operating policies with a different standpoint can be reflected to the system at the same time.

Figure 10:
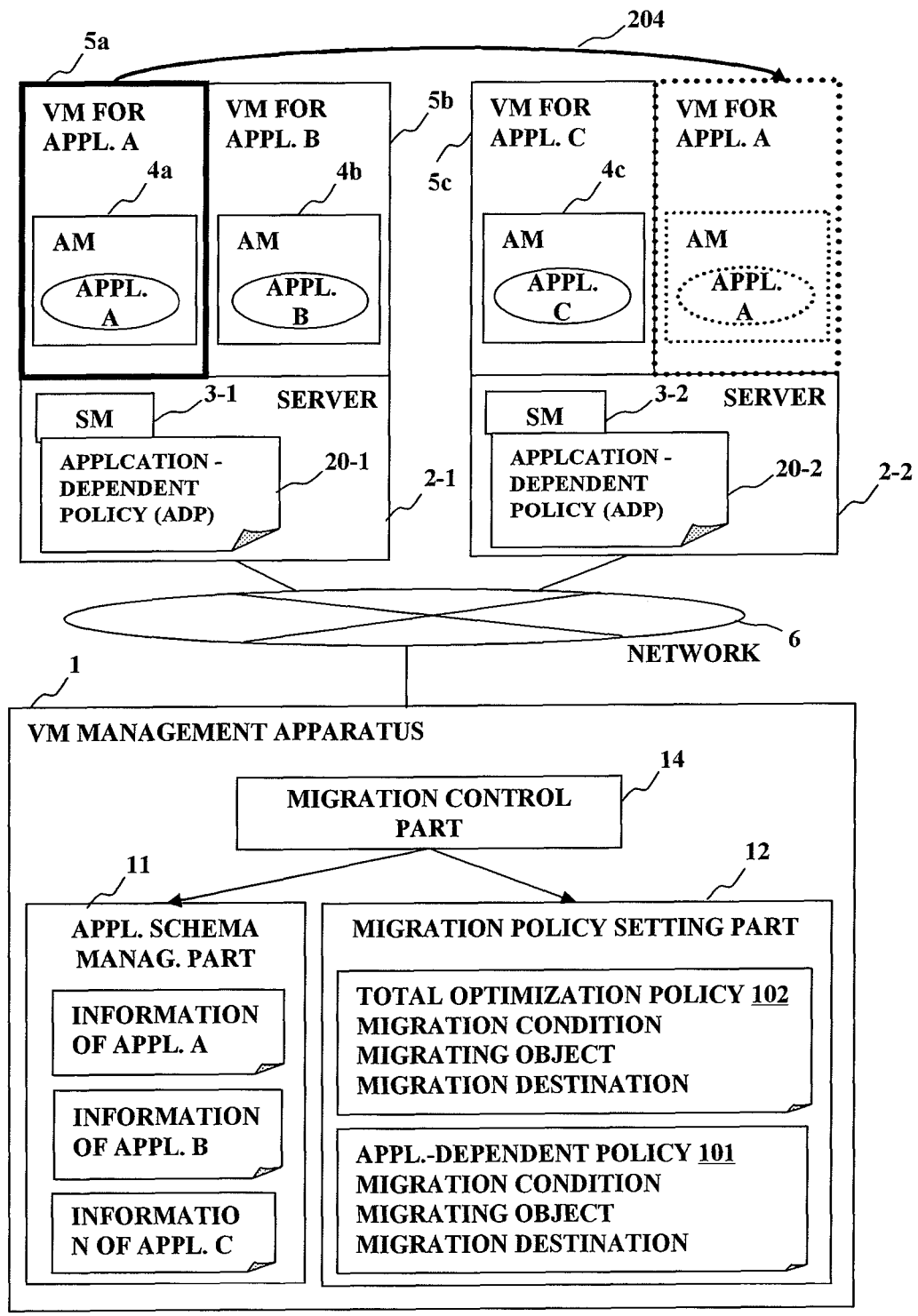
FIG. 10 shows an example of a basic migration system configuration according to an embodiment 2.

FIG. 10 shows a basic migration system configuration of the present invention (embodiment 2). The present system consists of two or more servers 2-1, 2-2 in which the virtual machine management apparatus 1 connected through the network 6, wherein each host OS was carried. As the same with the case of the embodiment 1, the server 2-1 is composed with server monitor (SM3-1), one or more divided virtual machine (VM5a, 5b), the application monitor (AM4a, 4b) which supervises the applications A and B which work on each virtual machine, and the server 2-2 is composed with server monitor (SM3-2), divided virtual machine (VM5c), and the application monitor (AM4c) which supervises application C.

Moreover, the application-dependent policy is set by the migration policy setting part 12 and stored in the memory area of the virtual machine management apparatus 1. In each server, it is beforehand copied from the virtual machine management apparatus 1, and held as the application-dependent policy 20-1 and 20-2 at the memory area of the server.

One application monitor per one application operates on the server and the information of the application is periodically reported to the server monitor according to the schema beforehand defined by the application information schema management part 11. Moreover, one server monitor per each physical server operates in the server. And whether there is any VM which fulfills the migration condition is judged by referring the copied application-dependent policy 20-1 and 20-2, and when there is an corresponding VM, migrating object is determined, and the following contents are periodically reported from each server to the migration control part 14.

(1) When there is No VM which Fulfills Migration Condition

The server monitor reports the static or dynamic information for load information of CPU of the server or a memory, the working information on VM, and status information of the application acquired from the application monitor, to the migration control part 14.

(2) When there is VM which Fulfills Migration Condition

The server reports the status information of the application added with the information of the migrating object. Here, as for the method of the report, the server monitor may transmit the information to the migration control part 14, or the migration control part 14 may ask it to the server monitor.

The virtual machine management apparatus 1 is composed with the application information schema management part 11 which manages the schema of the pre-defined application information, the migration policy setting part 12 which sets the total optimization policy of optimizing the whole system at migration of the virtual machine and application-dependent policy of depending on the application on the virtual machine, and the migration control part 14 which judges the migrating VM and controls the decision of the server for migration.

Furthermore, migration control part 14 receives periodically the status information of the application on the virtual machine from two or more server monitors according to the schema and static or dynamic information of the server and the VM, based on the received information, judges whether there is any VM to move according to the application-dependent policy and the total optimization policy or not, and decides the VM to move and the migration destination of the VM. Then it directs migration to the server of the migrating object.

The schema of the information (that is, information finally reported to the migration control part 14) which the application monitor reports to the server monitor is beforehand defined by the application operator in the application information schema management part 11. Using the schema defined here, the migration policy is set up in the migration policy setting part 12.

Furthermore, the migration condition required for migration, the migrating object (VM) moved to other server, and the migration destination (server) is defined in the migration policy setting part 12. The total optimization policy for optimizing the whole system is defined by the system operator, and the application-dependent policy depended on the application is defined by the application operator or the system operator. This application-dependent policy is beforehand copied to each server from the virtual machine management apparatus 1, and is held in the storage area in each server.

Figure 11:
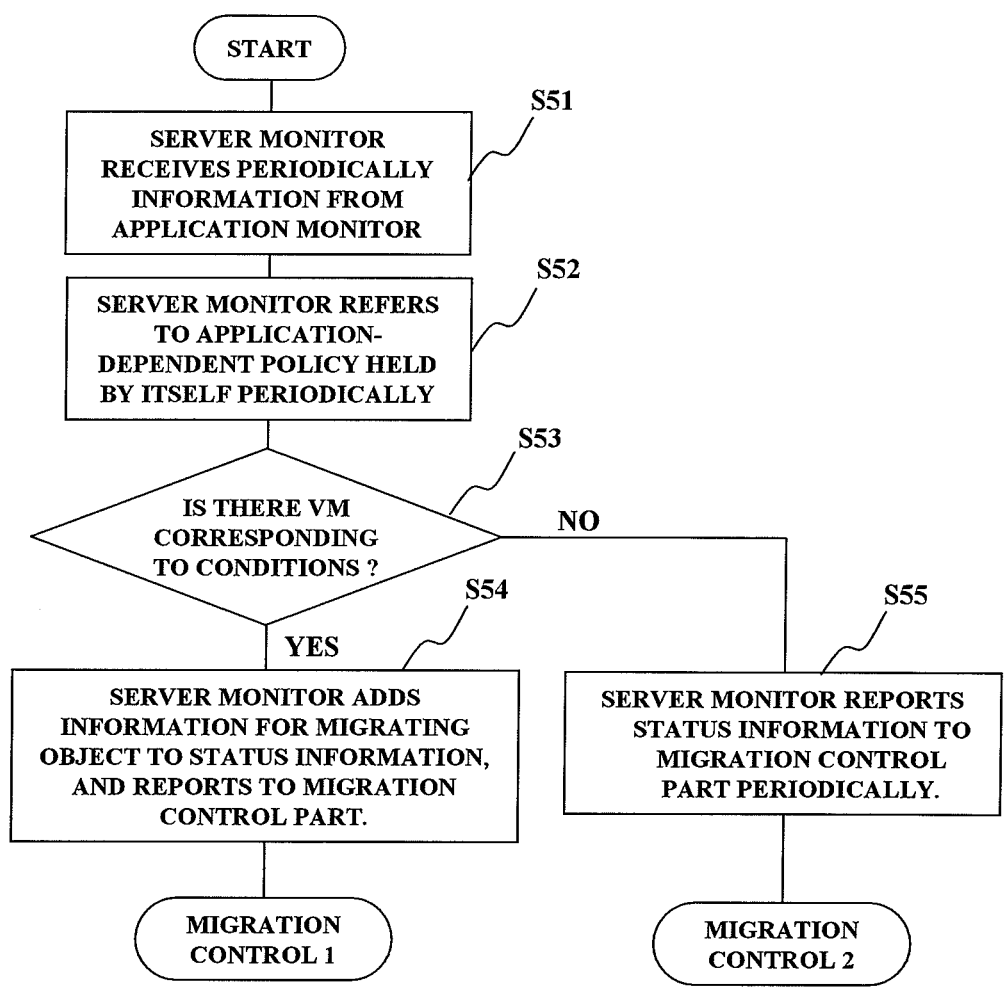
FIG. 11 shows an example of a flow chart of sending information from server monitor to migration control part, according to the embodiment 2.

FIG. 11 shows a flow chart of information sending from server monitor to migration controller. Here it shows the flow until the server monitor reports information to the migration control part 14.

In step S51, each server monitor receives periodically the information of application from an application monitor.

In step S52, each server monitor refers periodically to the application-dependent policy which copied beforehand from the virtual machine management apparatus 1 and held in own storage area.

In step S53, it is judged whether there is any VM which fulfills the migration condition of the application-dependent policy.

In step S54, when there is VM which fulfills condition as a result of a judgment, the server monitor adds the information for the migrating object to the status information, and reports to the migration control section 14.

In step S55, on the other hand, when there is no VM which fulfills condition, the server monitor reports only the status information to the migration control section 14.

Figure 12:
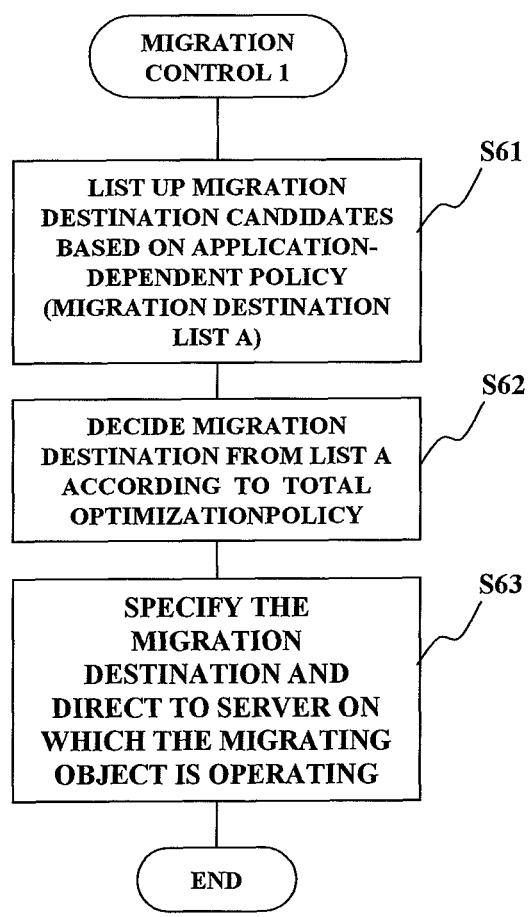
FIG. 12 shows an example of a flow chart of migration controlling at receiving status information from server monitor (the case 1), according to the embodiment 2.

FIG. 12 shows a flow chart of migration controlling at receiving status information from server monitor (case 1). This is a continuous flow (migration control 1) of FIG. 11 and shows the operation flow in the migration control part 14 when the status information added with the information of migrating object (virtual machine) is received from the server monitor.

In step S61, the migration control part 14 will list migration destination candidates as the migration destination list A based on the application-dependent policy of the migration policy setting part 12, when the information is received from a certain server monitor.

In step S62, the migration destination is determined from the migration destination list A according to the definition of the migration destination of the total optimization policy.

In step S63, the migration control part 14 specifies the migration destination and directs migration to the server which the migrating object is working. As mentioned above, although priority is given to the application-dependent policy, a migration control will be performed taking into the total optimization policy also.

Figure 13:
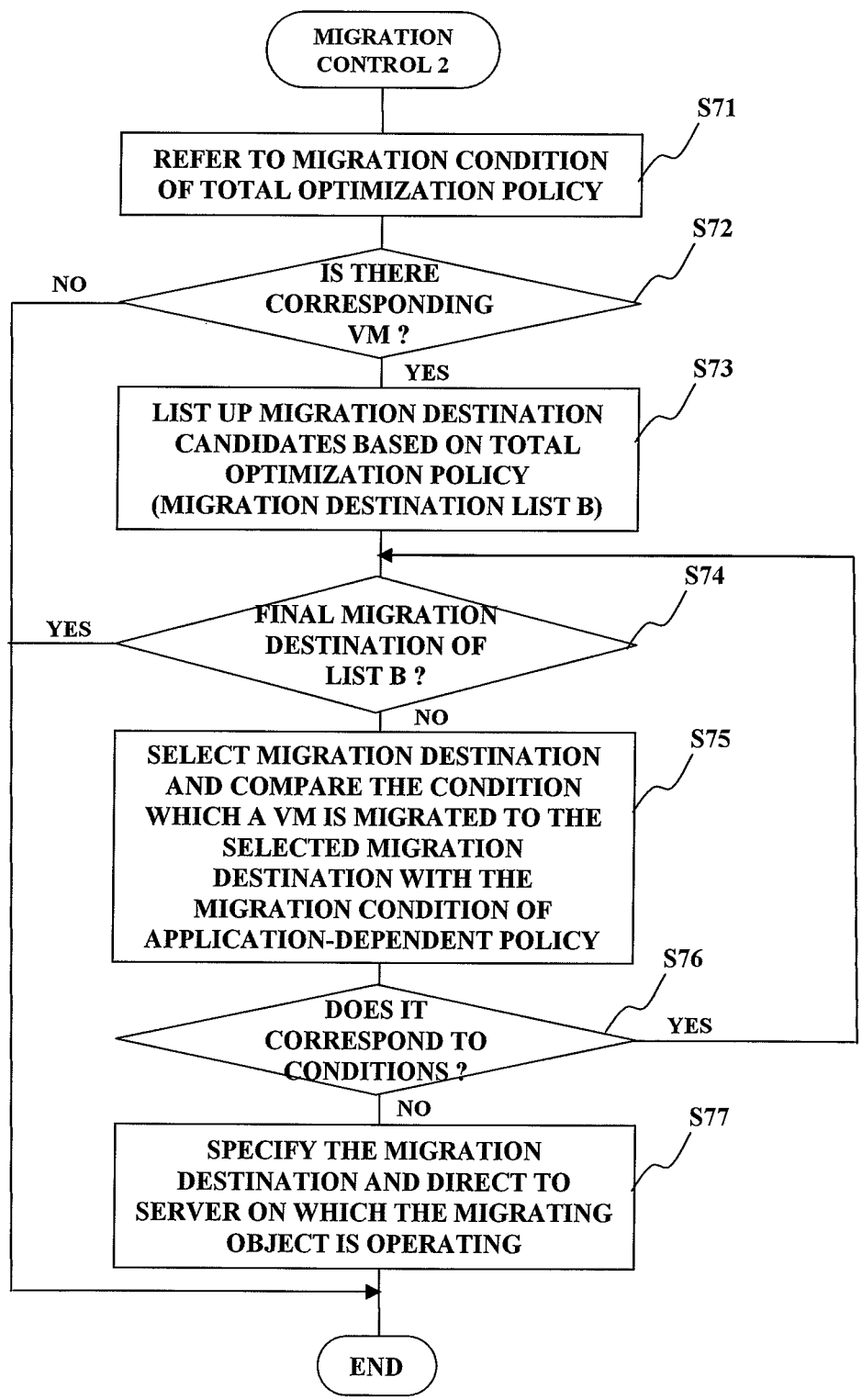
FIG. 13 shows an example of a flow chart of migration controlling at receiving status information from server monitor (the case 2), according to the embodiment 2.

FIG. 13 shows a flow chart of migration controlling at receiving status information from server monitor (case 2). It shows a flow of the migration control when the migration control part 14 receives only the status information from one certain server monitor as a continuation (migration control 2) of the flow of FIG. 11.

In step S71, the migration control part 14 refers periodically to the migration condition of the total optimization policy set up in the migration policy setting part 12.

In step S72, it is judged whether there is any VM which fulfills the migration condition. When there is no corresponding VM as a result of the judgment, migration is not performed and this flow is ended.

On the other hand, when there is the VM which fulfills the condition, in step S73, migration destination candidates are listed as the migration destination list B, based on the total optimization policy.

In step S74, it is judged whether all the migration destination candidates in the migration destination list B were selected.

In step S75, the one migration destination is chosen from the head of the migration destination list B, and it is compared with the migration condition of the application-dependent policy at the time of actually carrying out migration there.

In step S75, the one migration destination is selected from the head of the migration destination list B, and it is assumed that a virtual machine is migrated to the selected migration destination. The migration control part 14 checks whether there is any VM which fulfills the migration condition of the application-dependent policy based on the assumption.

In step S76, it is judged whether there is VM which fulfills the migration condition of the application-dependent policy.

When it is judged that there is VM which fulfills the migration condition of the application-dependent policy as a result of judgment, in step S76, the migration control part 14 specifies the migration destination and directs migration to the server which the migrating object is working.

On the other hand, when it corresponds to the migration condition of the application-dependent policy, migration is not performed, but returns to step S74, the next candidate is selected from the migration destination list B, and the subsequent processing is repeated.

In the above-mentioned flow, for the case which corresponds only to the migration condition of the total optimization policy, if migration is actually carried out, it corresponds to the migration condition of the application-dependent policy shortly, and migration will be carried out immediately. In such a case, the migration control part 14 controls migration so that may not be performed for efficiency.

Furthermore, the migration processing which embodies the case 1 or the case 2 of FIGS. 4 and 5 is explained below as the same with the embodiment 1 using FIGS. 14-17. In addition, the definition of the precondition for the system and application, the total optimization policy, and the application-dependent policy are the same as the embodiment 1. First, the flow of the reported information about the example of the case 1 is explained below using FIGS. 14 and 15. These examples show the case which a server monitor adds the information of the migrating object to the status information and reports it to the migration control part 14.

Figure 14:
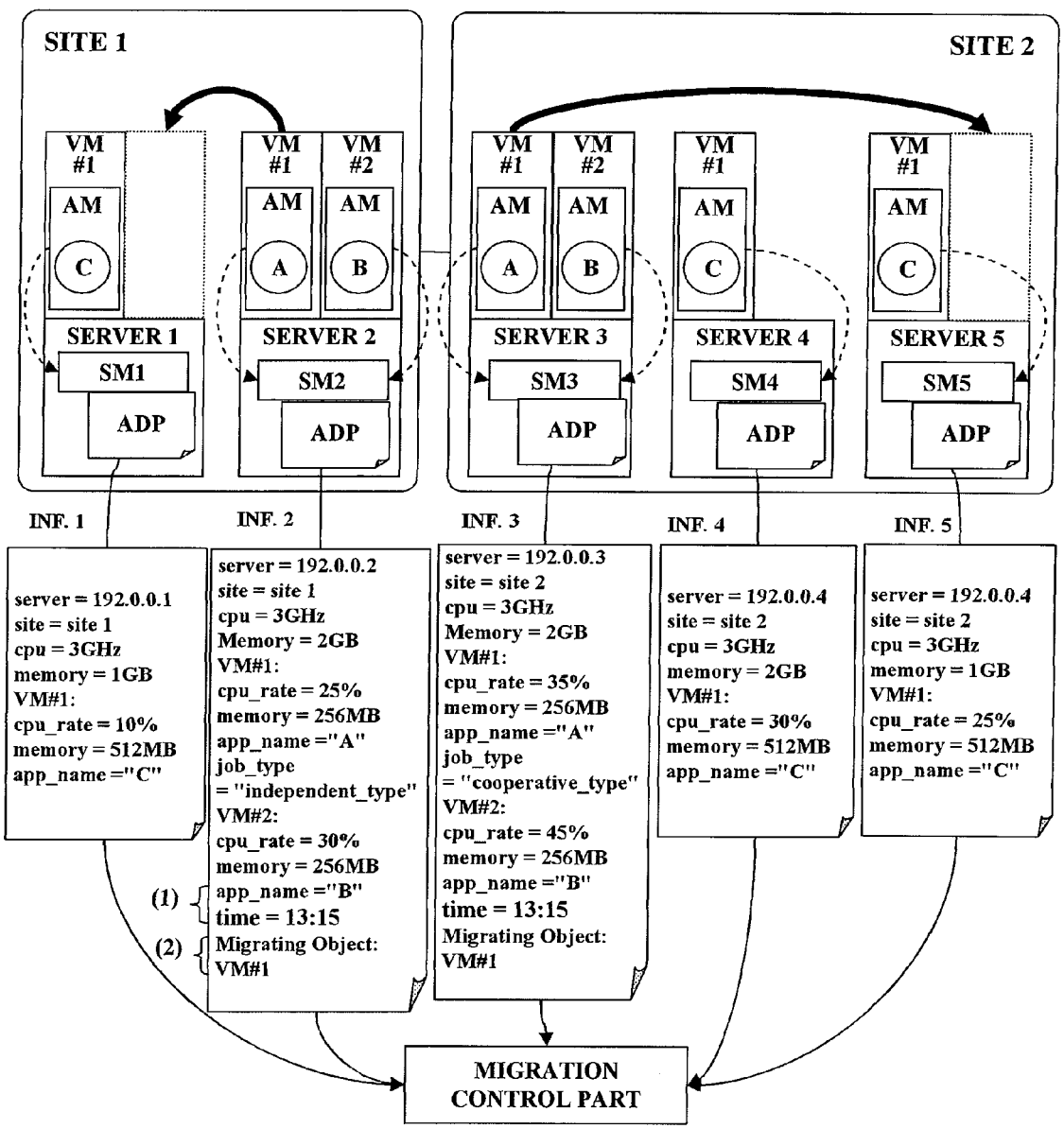
FIG. 14 shows an example of information acquired from server monitor and application monitor in the case 1.

FIG. 14 shows information acquired from server monitor and application monitor in the case 1. This example is the case 1. Since the application B is in a time zone which monopolizes the server, it shows that migration of the VM which other applications are working is carried out.

Focusing on the information 2 and 3 in the servers 2 and 3 which the application B is working, for example, in the information 2, as server information, the information of server name: 192.0.0.2, site name: site 1, CPU: 3 GHz, and memory: 2 GB is acquired, and as VM information, in VM#1, CPU activity ratio: 25%, memory: 256 MB and application name: A, job type:independent_type, and in VM#2, CPU activity ratio: 30% and memory: 256 MB is obtained.

Furthermore, the application B and time 13:15 are obtained as the information which corresponds to the migration condition of an application-dependent policy ((1) in FIG. 14), and VM#1 is obtained as the migrating object which was added ((2) in FIG. 14).

Moreover, in the information 3, as server information, the information of server name: 192.0.0.3, site name: site 2, CPU: 3 GHz, and memory: 2 GB is acquired, and as VM information, in VM#1, CPU activity ratio: 35%, memory: 256 MB and application name: A, job type: cooperative_type, and in VM#2, CPU activity ratio: 45%, memory: 256 MB is obtained. Furthermore, application name: B and time: 13:15 are obtained as the information which fulfills the migration condition of the application-dependent policy as the same with the information 2, and VM#1 is obtained as the added migrating object.

Figure 15:
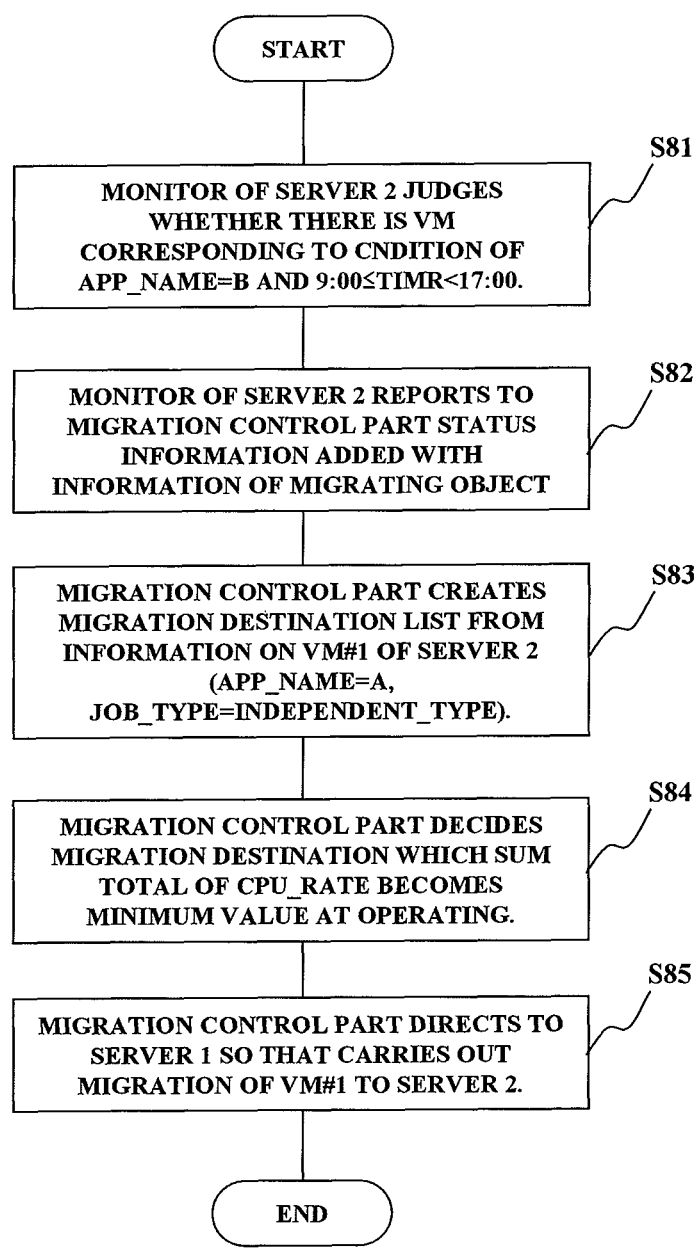
FIG. 15 shows an example of a flow chart of migration processing based on an application-dependent policy (the case 1), according to the embodiment 2.

FIG. 15 shows a flow chart of migration processing according to application-dependent policy (case 1).

In step S81, with reference to the application-dependent policy stored in server itself, it is determined whether the VM which fulfills the migration condition of app_name="B" and 9:00≦time<17:00 exists.

In step S82, the VM corresponding to the condition of step S81 is VM#2 of the server 2, and since the definition of migrating object in the application-dependent policy is "VM(s) for applications other than the application B", VM#1 of the server 2 is determined, and the server monitor of the server 2 reports the information for migration (VM#1 of the server 2) to the migration control part 14, adding it to the status information.

In step S83, the migration control part 14 creates the migration destination list (the servers 1, 4, and 5 are listed as candidates) from the application information (app_name="A", job_type="independent_type") by referring to the application-dependent policy in the migration policy setting part 12.

In step S84, the server 1 which the sum total of the CPU activity ratio (cpu_rate) of VM becomes minimum is selected as the migration destination from the migration destination list with reference to the total optimization policy in the migration policy setting part 12.

Incidentally, the sum total of the CPU activity ratio (cpu_rate) in the server 1, the server 4, and the server 5 is 10%, 30%, and 25% respectively.

In step S85, the migration control section 14 directs to the server 2 to carry out migration of VM#1 to the server 1.

Next, using FIGS. 16 and 17, the flow of the reported information of the case 2 is explained below. The case 2 shows an example of migration in the case that the VM which fulfills the migration condition of the total optimization policy exists, although there is no VM which fulfills the migration condition of an application-dependent policy.

FIG. 16 shows information acquired from server monitor and application monitor in the case 2. The present invention solves the proposition of "liking to move the VM which the application A is working to others since the load of the server 3 in the site 2 is high". As an example of the server information, focusing the information 3 from the server 3 in the site 2, it is explained as following. As the server information, server_name: 192.0.0.3, the site_name: site 2, CPU: 3 GHz, and memory: 2 GB are acquired, and as VM information, in the case of VM#1, CPU activity ratio: 85%, memory: 256 MB, application name: A, job type: cooperative_type, and in the case of VM#2, CPU activity ratio: 25%, memory: 256 MB, application name: B, and time: 22:20 are obtained.

FIG. 17 shows a flow chart of migration processing according to application-dependent policy (case 2).

In step S91, the server monitor of each server judges whether there is any VM which fulfills the condition of app_name="B" and 9:00≦time<17:00, with reference to the application-dependent policy stored in itself.

In step S92, since the VM which fulfills the condition of the application-dependent policy does not exist, each server monitor reports only the status information to the migration control part 14.

In step S93, the migration control part 14 determines whether the information received from each server monitor includes the VM information (VM which is CPU activity ratio of cpu_rate≧80%), referencing to the migration condition of the total optimization policy in the migration policy setting part 12.

Since the information (cpu_rate=85%) which corresponds to the condition is included in the information transmitted by the server monitor of the server 3, VM#1 of the server 3 becomes the migrating object.

In step S94, the migration destination list is created based on the application information of VM#1 of the server 3 (app_name="A", job_type="cooperative_type", and the site=site 2), and sorted it according to the defined migration destination of the total optimization policy (the server 4, 5).

Incidentally, the sum total of the CPU activity ratio (cpu_rate) in the server 4 and the server 5 is 30% and 25%, respectively.

In step S95, when migration of VM#1 of the server 3 is carried out to the server 5, it is judged whether it corresponds to the migration condition (VM which is app_name="B" and is 9:00≦time<17:00) of the application-dependent policy.

In Step S96, since it does not correspond to the migration condition, the migration control part 14 directs to the server 3 so that migration of VM#1 may be carried out to the server 5.

As mentioned above, in the case of the embodiment 2, each server copies beforehand the application-dependent policy from the virtual machine management apparatus 1, holds itself, and determines whether there is any VM corresponding to the migration condition or not. By this invention, the efficiency of migration processing can be raised compared with the case of the embodiment 1 where the determination of the migration destination is processed only by the virtual machine management equipment side.

Here, the apparatus and the method explained in above mentioned embodiments are possible to be realized by executing the program implemented into a computer such as a personal computer or a server, wherein the computer-readable recording medium like a hard disk, CD-ROM, MO, DVD etc. recorded with the program is provided, and at starting up, the program is read out from the recording medium by the CPU and it is executed.

What is claimed is:

1. A computer-readable, non-transitory medium storing a program that causes a computer to execute a procedure, the procedure comprising:

providing an application-dependent policy which is described beforehand by using a schema indicating a status of application, wherein the application-dependent policy contains an arbitrary evaluation formula for judging whether a migration of a virtual machine (VM) can be performed or not, the VM to be migrated as a migrating object, and a condition of a server to arrange the VM, and a total optimization policy being set beforehand for totally optimizing a server system, wherein the total optimization policy contains the arbitrary evaluation formula for judging whether the migration can be performed or not, the VM to be migrated as the migrating object, and the condition of the server to arrange the VM;

receiving periodically from each of plurality of servers, status information of the application operating on the VM and static or dynamic information about the plurality of servers and the VM;

judging, based on the received information, whether there exists the VM to be migrated to another server by referring to the application-dependent policy and the total optimization policy; and determining the another server as the migration destination to which the VM is to be migrated, when there exists the VM to be migrated.

2. The computer-readable, non-transitory medium of claim 1, wherein the schema includes status information on a usage situation of each application operating on the VM.

3. The computer-readable, non-transitory medium of claim 1, wherein the judging step is performed by giving priority to the application-dependent policy over the total optimization policy.

4. The computer-readable, non-transitory medium of claim 1, wherein the judging step is performed by referring to the total optimization policy when there is no VM which is to be migrated to another server and satisfying the migration condition of the application-dependent policy.

5. The computer-readable, non-transitory medium of claim 4, wherein in the judging step, a candidate for the migration destination of the VM is selected by referring to the total optimization policy when there is no VM which is to be migrated to the another server and satisfies the migration condition of the application-dependent policy, and it is judged whether there emerges any VM satisfying the migration condition of the application-dependent policy by assuming that the VM is migrated to the selected candidate for the migration destination.

6. The computer-readable, non-transitory medium of claim 5, wherein the judging step is performed by not referring to the total optimization policy, when there exists the VM satisfying the migration condition of the application-dependent policy.

7. The computer-readable, non-transitory medium of claim 1, wherein the server information and the application information on the VM are obtained respectively through a server monitor equipped in the server and an application monitor equipped in the VM.

8. A computer-readable, non-transitory medium storing a program that causes a computer to execute a procedure, the procedure comprising:
providing an application-dependent policy which is described beforehand by using a schema indicating a status of application, wherein the application-dependent policy contains an arbitrary evaluation formula for judging whether a migration of a virtual machine (VM) can be performed or not, the VM to be migrated as a migrating object, and a condition of a server to arrange the VM, and a total optimization policy being set beforehand for totally optimizing a server system, wherein the total optimization policy contains the arbitrary evaluation formula for judging whether the migration can be performed or not, the VM to be migrated as the migrating object, and the condition of the server to arrange the VM;
wherein the application-dependent policy is duplicated from a VM management apparatus for managing migration of the VM and held in each of plurality of servers;
receiving periodically from each of plurality of servers, a status information of an application operating on the VM and static or dynamic information about the plurality of servers and the VM, wherein a migration information of the VM is added to the received status information of the application when there exists the VM to be migrated by referring to the application-dependent policy held in the server;
judging, based on the received information, whether there exists the VM to be migrated to another server by referring to the application-dependent policy and the total optimization policy; and
determining the another server as a migration destination to which the VM is to be migrated when there exists the VM to be migrated.

9. An apparatus for managing, among a plurality of servers, migration of a virtual machine (VM) on which an application is under operation, comprising:
a providing part configured to provide an application-dependent policy which is described beforehand by using a schema indicating a status of application, wherein the application-dependent policy contains an arbitrary evaluation formula for judging whether a migration of a virtual machine (VM) can be performed or not, the VM to be migrated as a migrating object, and a condition of the server to arrange the VM, and a total optimization policy being set beforehand for totally optimizing a server system, wherein the total optimization policy contains the evaluation formula for judging whether the migration can be performed or not, the VM to be migrated as the migrating object, and the condition of the server to arrange the VM; and
a receiving part configured to receive periodically from each of the plurality of servers, status information of an application operating on a VM and static or dynamic information about the plurality of servers and the VM;
a migration control part for judging based on the received information whether there exists the VM to be migrated to another server by referring to the application-dependent policy and the total optimization policy, and determining the another server as a migration destination to which the VM is to be migrated, when there exists the VM to be migrated.

10. The apparatus of claim 9, wherein the schema includes status information on a usage situation of each application on the VM.

11. The apparatus of claim 9, wherein the migration control part performs migration processing by giving priority to the application-dependent policy over the total optimization policy.

12. The apparatus of claim 9, wherein the migration control part determines the migration destination of the VM on the basis of the total optimization policy, when there is no VM to be migrated to another server according to the application-dependent policy.

13. The apparatus of claim 9, wherein the server information and the application information on the VM are obtained respectively through a server monitor equipped in the server and an application monitor equipped in the VM.

14. An apparatus for managing, among a plurality of servers, migration of a virtual machine (VM) on which an application is under operation, comprising:
a providing part configured to provide an application-dependent policy which beforehand by using a schema indicating a status of application, wherein the application-dependent policy contains an arbitrary evaluation formula for judging whether a migration of a virtual machine (VM) can be performed or not, the VM to be migrated as a migrating object, and a condition of the server to arrange the VM, and a total optimization policy being set beforehand for totally optimizing a server system, wherein the total optimization policy contains the evaluation formula for judging whether the migration can be performed or not, the VM to be migrated as the migrating object, and the condition of the server to arrange the VM; and
a migration control part of the VM, wherein the migration control part makes each server duplicate the application-dependent policy and retains it in the server itself, makes the server judge whether there is the VM which corresponds to a migration condition of the application-dependent policy, receives the status information of the application added with a migration information of the VM to be migrated to another server from each server, in the case of no corresponding VM, receives the status information of the application on the VM and a static or dynamic information of the server and the VM, judges, based on the received status information, whether there is the VM matching to the condition of the application-dependent policy and the total optimization policy, and determines the migration destination of the VM when there is the VM.

15. A method for migrating, among a plurality of servers, a virtual machine (VM) on which an application is under operation, executed by a computer apparatus, the method comprising:

providing an application-dependent policy which is described beforehand by using a schema indicating a status of application, wherein the application-dependent policy contains an arbitrary evaluation formula for judging whether a migration of a virtual machine (VM) can be performed or not, the VM to be migrated as a migrating object, and a condition of a server to arrange the VM, and a total optimization policy being set beforehand for totally optimizing a server system, wherein the total optimization policy contains the arbitrary evaluation formula for judging whether the migration can be performed or not, the VM to be migrated as the migrating object, and the condition of the server to arrange the VM;

receiving periodically from each of the plurality of servers, status information of an application operating on the VM and static or dynamic information about the plurality of servers and the VM;

judging, based on the received information, whether there exists the VM to be migrated to another server by referring to the application-dependent policy and the total optimization policy; and determining the another server as a migration destination to which the VM is to be migrated when there exists the VM to be migrated.

* * * * *